Sept. 20, 1971     C. C. DE ROZARIO     3,605,993
ROLLER CHAIN CONVEYOR ACCUMULATOR
Filed March 9, 1970     2 Sheets-Sheet 1
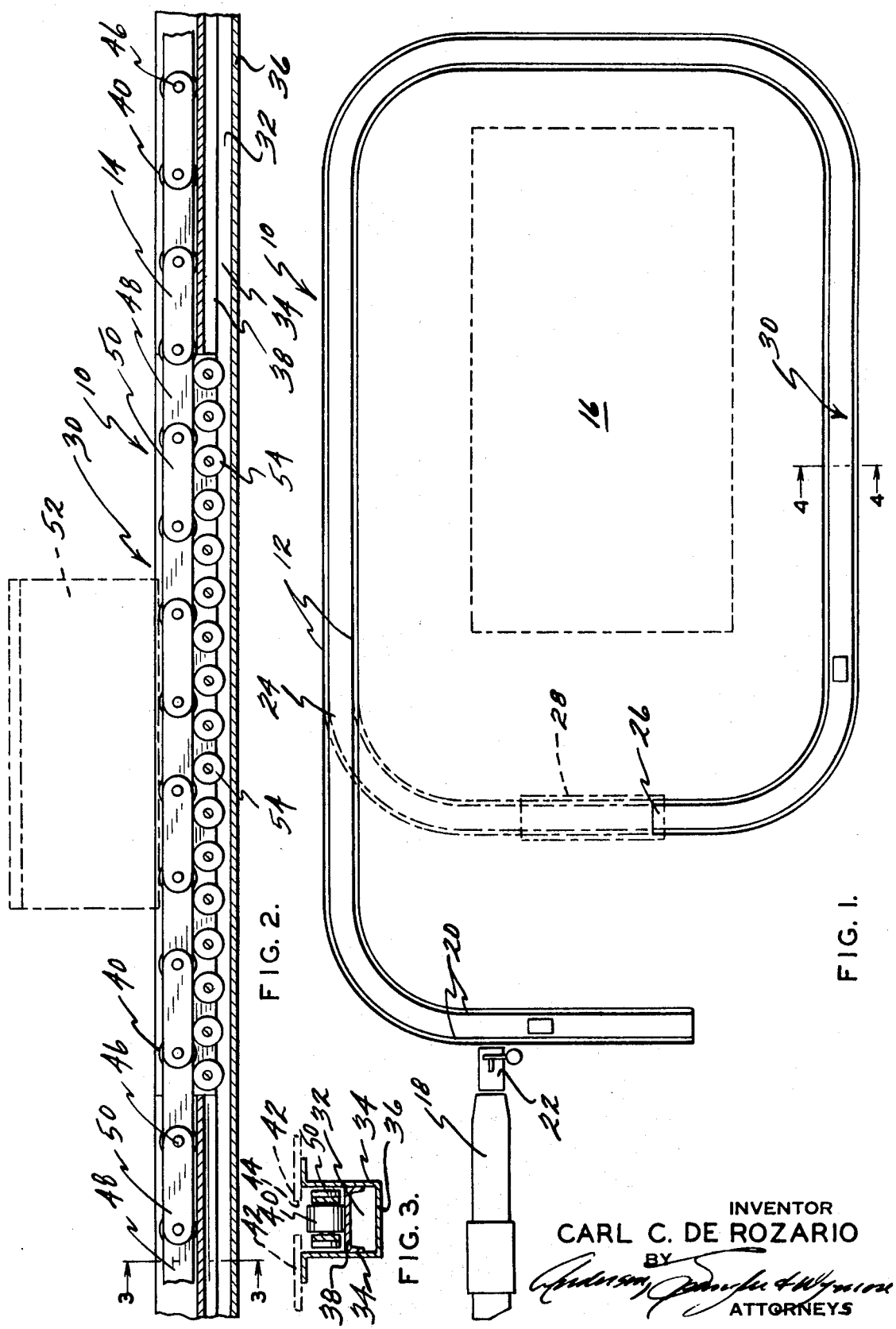
INVENTOR
CARL C. DE ROZARIO
BY
ATTORNEYS Sept. 20, 1971   C. C. DE ROZARIO   3,605,993
ROLLER CHAIN CONVEYOR ACCUMULATOR
Filed March 9, 1970   2 Sheets-Sheet 2
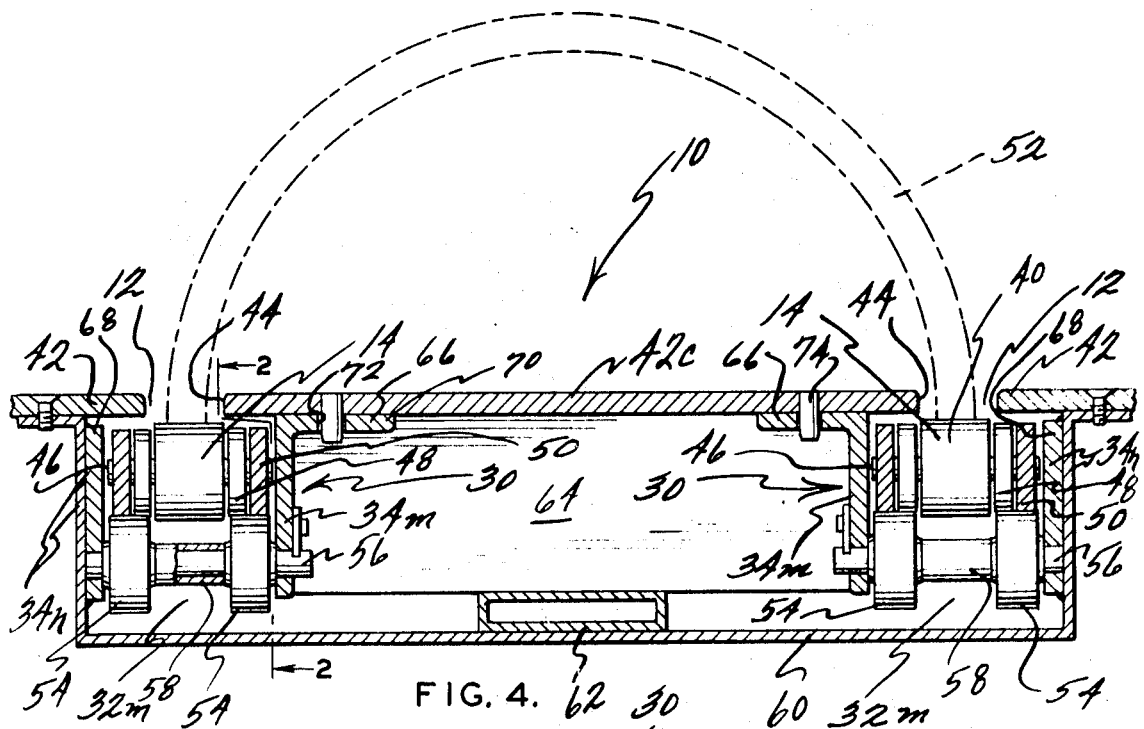
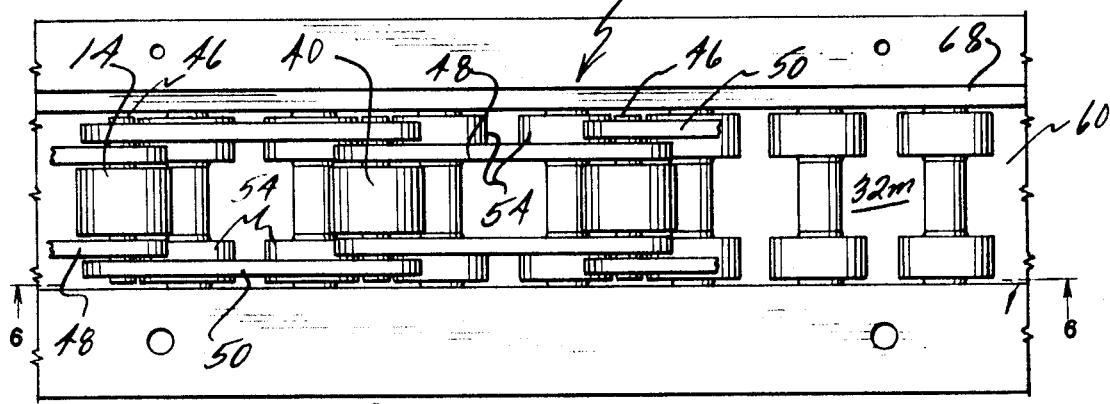
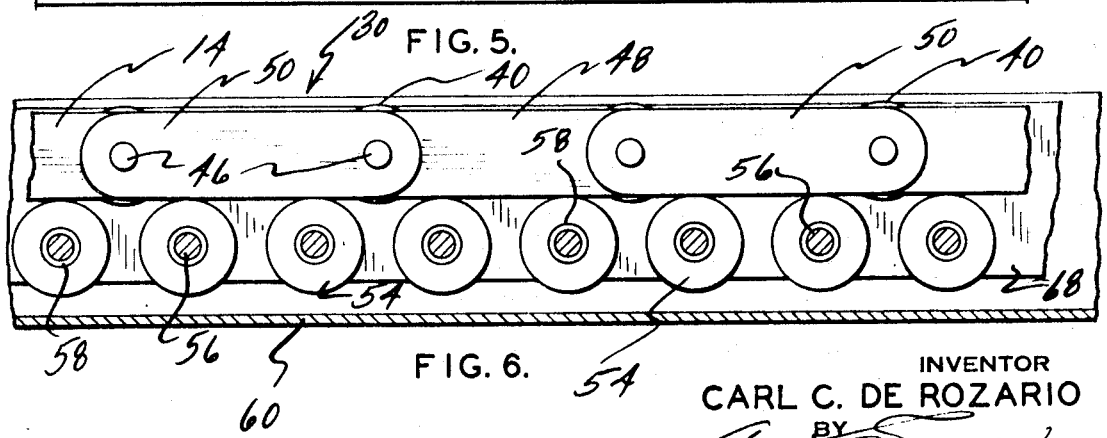
INVENTOR
CARL C. DE ROZARIO
BY
ATTORNEYS

United States Patent Office 3,605,993
Patented Sept. 20, 1971

3,605,993
ROLLER CHAIN CONVEYOR ACCUMULATOR
Carl C. De Rozario, Denver, Colo., assignor to
Cutler-Hammer, Inc., Milwaukee, Wis.
Filed Mar. 9, 1970, Ser. No. 17,798
Int. Cl. B65g *17/24*
U.S. Cl. 198—183          8 Claims

ABSTRACT OF THE DISCLOSURE

This invention relates to an accumulator section for a roller chain conveyor run wherein the connecting links pivotally interconnecting adjacent rollers of the chain for rotational movement are supported on both sides by a series of stationary idler rollers that permit the chain rollers to turn freely in either direction therebetween.

---

In certain specialized applications, it becomes necessary to slow down or stop the movement of goods on one section of a roller conveyor while other sections thereof continue to run at normal speed. Among these applications is the movement of stereo plates along the press deck to and from the presses in a newspaper plant.

The freshly recast and shaved stereo plates known as "white" plates leave the shaver and are automatically delivered one-at-a-time to a pair of parallel roller chain conveyors running underneath the press deck by transfer apparatus such as that forming the subject matter of U.S. Pat. No. 3,481,499. Several such shavers and transfer units are customarily used side-by-side feeding a single roller conveyor run. It is important that the "white" plates reach the presses as soon as possible so that they are available immediately when needed. Thus, a high speed section of the roller conveyors is needed between the shavers and presses. On the other hand, once the white plates arrive in front of the presses, there may be some delay before they are inserted into the presses and, as a result, a stop is actually actuated which will hold them stationary while the conveyors continue to run therebeneath.

A similar situation is likely to arise on the return run of the roller conveyors where used stereo plates, commonly referred to as "black" plates due to the ink thereon, are returned to the melting facility for rework. It is not at all uncommon for one crew to strip all the black plates from the presses at the end of their shift and set them around on the press deck for the next shift to rework. Then, the next shift comes along and loads all the plates onto the conveyor for return to the melting facility despite the fact that it can only handle them at a predetermined rate. The net result in both instances is oftentimes a long line of plates in end-to-end relation with sufficient thrust developing therebetween that they begin to hump and buckle.

The reason for this, of course, that once the plates are held back, the conveyor rollers must continue to roll forward therebeneath developing a great deal of friction as they slide along the edges thereof. As each successive plate enters the train thereof, it adds its frictional thrust to the one at the front until, eventually, a predetermined limit is exceeded and humping occurs. It has been found, for example, that about twenty plates can be held back on some roller conveyors with safety but that once this number is exceeded, humping develops almost instantly.

Short of stopping the plates altogether, it is also important to be able to slow them down and collect them, release the black plates at pre-determined intervals to the melting facility, and otherwise have some of the plates moving at different speeds than others on the same conveyor system. Similar needs are likely to be present in many different roller conveyor systems other than those found on the press deck of a newspaper.

It has now been found in accordance with the teaching of the instant invention that these and other problems inherent in the prior art subfloor roller conveyor systems can, in large measure, be eliminated by simply removing the stationary support from beneath the chain rollers and substituting therefor a series of idler rollers alongside thereof in rolling engagement with the underside of the links interconnecting same at those places in the run where it is desirable to slow down or stop the goods conveyed thereon. By supporting the chain rollers free of the stationary support therefor, they need no longer roll forward and can either cease all rotational movement with a load resting thereon or turn backwards as the load is restrained. Ordinarily, of course, the load moves forwardly along a roller conveyor chain at twice the speed of the chain due to the rollers rolling along the supporting surface and also imparting forward thrust to the load resting thereon. Thus, by merely supporting the rollers free of rolling engagement with their supporting surface, the speed of the load is cut in half as it beigns to move along with the chain at its same speed. This feature alone enables loads spaced apart a considerable distance along the roller chain to be brought closer together and collected within an accumulator section like that forming the subject matter hereof. For instance, an accumulator section in front of the presses will collect the white plates by automatically closing the spaces left therebetween that exist by virtue of their leaving the shavers one-at-a-time at pre-determined intervals. While being thus collected or accumulated, the plates are also moving past the presses at half speed which provides a great deal more time to remove and install them in the presses.

One of the most significant advantages, however, is the fact that almost three times as many plates can be held back on an accumulator section before humping occurs as is possible without one. For instance, tests have shown that approximately three times the pull on the roller chain is required to slide it along under a restrained load where the chain rollers are rolling along their support as is required when said rollers are lifted free of such support and can turn backwards. This factor, of course, reduces the end thrust on the load by almost one-third which should enable almost three times the plates to be accumulated without humping.

On the discharge end, an accumulator section permits the operator to accumulate somewhere near three times the number of plates as before and, in addition, to release them one-at-a-time at pre-determined intervals scheduled to correspond with the rate at which the remelting facility can handle them. Heretofore, only a relatively few plates could be accumulated before some had to either be released or removed from the conveyor altogether if the downstream capacity was limited.

It is, therefore, the principal object of the present invention to provide a novel and improved accumulator section for roller conveyor systems.

A second objective of the invention herein disclosed and claimed is the provision of means for supporting a section of roller chain by its connecting links such that its rollers are freed to turn independently of their normal supporting surface.

Another object is to provide a device of the type aforementioned that automatically functions to reduce the speed of the load to one half its normal speed while, at the same time, reducing the spacing therebetween.

Still another object is the provision of apparatus for accumulating nearly three times the number of objects in end-to-end relation on a roller chain conveyor before humping occurs as was heretofore possible.

An additional object is to provide an idler roller section supporting the connecting links of a roller conveyor chain for rolling engagement while using the chain rollers solely for load support.

Further objects of the invention are to provide an accumulator for roller conveyor chains that is compact, rugged, relatively inexpensive, versatile, simple to install, easy to service and which supplements normal operation of the conveyor without interfering therewith.

Other objects will be in part apparent and in part pointed out specifically hereinafter in connection with the description of the drawings that follows, and in which:

FIG. 1 is a plan view showing a representative double roller chain conveyor system of the type that might be used in the press deck of a newspaper plant;

FIG. 2 is a fragmentary section to a reduced scale taken along line 2—2 of FIG. 4;

FIG. 3 is a transverse section taken along line 3—3 of FIG. 2;

FIG. 4 is a fragmentary transverse section to a greatly enlarged scale taken along line 4—4 of FIG. 1;

FIG. 5 is a fragmentary top plan view with the deck plates removed showing the accumulator section; and FIG. 6 is a fragmentary section taken along line 6—6 of FIG. 5.

Referring now to the drawings for a detailed description of the present invention and, initially, to FIG. 1 for this purpose, reference numeral 10 has been selected to broadly designate a double roller chain conveyor system of a type commonly used in the press room of a newspaper plant that includes transversely-spaced parallel runs 12 of conventional roller chain 14 that form two endless loops encircling a bank of presses that have been represented schematically by the broken line rectangle 16. In the particular form shown, white stereo plates from a shaver 18 are placed on a similar double-chain plate delivery system 20 by hand or a device 22 like that of the previously-identified patent for movement into the intake end 24 of the primary system 10. At the discharge end 26 of the primary loop, the used "black" plates are removed therefrom and reworked in a melting facility broadly identified by numeral 28 that, once again, has been represented schematically by a broken line rectangle. Approaching the discharge end of the primary loop in back of the presses is located one accumulator subassembly that has been indicated in a general way by numeral 30 and which forms the subject matter of the instant invention. Another such section would, under most circumstances, be located in front of the press bank to accumulate white plates.

Next, with reference to FIGS. 2 and 3, it will be seen that the tracks for the roller chain 14 each comprise an upwardly-opening channel 32 formed by transversely-spaced parallel side walls 34 interconnected by a horizontal bottom wall 36. These side walls 34 confine the sides of the chain while a rail member 38 spaced above the bottom thereof supports the rollers 40 of said chain for rolling movement therealong in the conventional manner. Deck plates 42 partially cover the channel and cooperate to define a guide slot 44 therebetween.

The chain itself is most clearly revealed in FIGS. 4, 5 and 6 to which brief reference will now be made. Each chain includes a series of rollers 40 arranged in longitudinally spaced relation for rotation about transverse axes defined by parallel roller axles 46. Adjacent pairs of the roller axles are pivotally interconnected by both ends by inner pivot links 48 extending longitudinally therefrom in one direction and by outer pivot links 50 projecting longitudinally in the opposite direction. The diameter of the rollers exceeds the width of the links so that said rollers alone will engage and roll along the rails 38 as seen in FIG. 2 and opposite extremities of FIG. 3.

The load 52, whatever its shape, rests atop the rollers 40 as seen in FIGS. 2 and 4. As illustrated, the load comprises a stereo plate which has a hollow semi-cylindrical shape (broken lines in FIG. 4) which requires that the two parallel chain runs 12 be spaced apart the diameter thereof so that its straight longitudinal edges pass down through the guide slots 44 in the deck plates and sit atop the rollers 40 which both support and drive it forwardly along the track so long as they engage the rails 38.

Now, the essence of the invention is revealed in FIGS. 2-6, inclusive, where the accumulator subassembly 30 is shown. A section of the rail 38 is removed from the tracks for whatever distance one wishes to slow down and collect or stop and accumulate the plates 52 or some other load. Substituted for this removed section of rail are two longitudinally aligned rows of idler rollers 54 extending along both sides of the channel 32 in transversely-spaced parallel supporting relation to both the inner and outer chain links corresponding thereto. The transverse spacing between the rows of idlers is such as to pass the chain rollers 40 freely therebetween so that they are thus disengaged from any part of the track or rail and may, therefore, turn independently in either direction as well as not turn at all. With the roller chains 12 supported for rolling engagement by the links thereof rolling along the idler rollers 54, the chain rollers 40 thus become idlers themselves instead of drive rollers and they function to merely support the load 52 without moving it forward as is the case when said chain rollers engage the rail 38. If one stops the load or restrains it in such a manner that it moves slower than the chain supporting it, the chain rollers will turn backward and impart a relatively insignificant amount of forward thrust to the load even though the chain continues to move forwardly therebeneath at its usual speed.

Finally, with particular reference to FIGS. 4, 5 and 6, it will be seen that in the particular form illustrated, the rollers 54 in the two rows thereof are arranged in transversely-spaced coaxial pairs for rotation on a common axle 56. This is, of course, but one way of mounting and arranging the idlers as they could easily be located in staggered rows and journalled for rotation on separate stub shafts instead of a common one. The axles 56 are arranged in parallel relation to one another and spaced apart longitudinally a distance considerably less than that which separates the axes of rotation of the chain rollers 40 so that at least two idlers support a given link at all times as shown most clearly in FIG. 6. The longitudinal spacing of the idlers should be such as to maintain an essentially coplanar relation between the axes of rotation of the chain rollers at all times and thus prevent the chain from moving from idler to idler with a "roller-coaster" effect which would remove part thereof as support for the load.

Spacers 58 on each axle 56 maintain the required transverse spacing between the idler rollers. As illustrated, the entire accumulator subassembly is recessed beneath the deck plates within a shallow tray 60 bolted or otherwise fastened to the underside of the latter. A reinforcing member 62 is shown running along the center of the tray in supporting relation to a series of longitudinally spaced transversely-extending cross pieces 64 that carry angle irons 66 on opposite ends thereof. The vertically-disposed flanges of these angle irons define the inner side walls 34m of the accumulator track 32m while the sides of the tray reinforced with plates 68 define the outer side walls 34n thereof. The horizontal angle iron flanges 70 are apertured as at 72 to receive pins 74 projecting from the underside of center deck plate section 42c.

Between the rail 38 and idlers 54, the roller chain is supported throughout its run with said idlers commencing where the rail ends and vice versa. The overall width of the track remains substantially the same as that required to receive the rail alone; whereas, very little additional depth is needed to accommodate the parallel rows of idlers.

What is claimed is:

1. The roller chain conveyor which comprises: elongate transversely-spaced substantially vertical side wall defining an upwardly opening track therebetween; a row of idler rollers extending along each side wall spaced beneath the top thereof in transversely spaced parallel relation to one another, the rollers of each row thereof being mounted for rotation about substantially horizontal longitudinally-spaced parallel axes; and, a roller chain mounted within the track for rolling engagement atop the rows of idler rollers between the side walls, said chain including inner and outer pairs of transversely-spaced parallel links pivotally interconnected in alternate end-to-end relation by longitudinally-spaced parallel axles that journal chain rollers for rotational movement about horizontal axes extending therebetween, said chain rollers defining spacers adapted to hold the links apart in position to roll along atop the idler rollers, and said chain rollers being of a width adapted to turn freely between the idler rollers.

2. The roller chain conveyor as set forth in claim 1 in which: adjacent chain rollers are spaced apart longitudinally a distance greater than the distance separating the idler rollers on each side thereof.

3. The roller chain conveyor as set forth in claim 1 in which: the diameter of the chain rollers is greater than the width of the links at their widest part.

4. The roller chain conveyor as set forth in claim 1 in which: the idler rollers of the parallel rows thereof are arranged in transverse alignment with one another.

5. The roller chain conveyor as set forth in claim 2 in which: the spacing between the axes of rotation of adjacent chain rollers is approximately twice the distance separating adjacent idler roller axes so that each link will be supported by at least two idler rollers.

6. The roller chain conveyor as set forth in claim 3 in which: an elongate horizontal rail runs along the bottom of the track and supports the chain for a portion of its length with the chain rollers rolling along atop thereof, said idler rollers and rail cooperating at the juncture therebetween to support both the chain rollers and links while the latter move from one to the other of said supports.

7. The roller chain conveyor as set forth in claim 4 in which: the transversely-spaced pairs of idler rollers are journalled for rotation on a common axle.

8. The roller chain conveyor as set forth in claim 7 in which: spacers are provided on each idler roller axle adapted to hold said rollers apart a distance which will permit the chain rollers to pass freely therebetween.

References Cited

FOREIGN PATENTS 55,550    6/1968    Poland _____ 198—183

EDWARD A. SROKA, Primary Examiner

U.S. Cl. X.R.

198—189